(12) United States Patent
Lathia et al.

(10) Patent No.: US 9,171,265 B1
(45) Date of Patent: Oct. 27, 2015

(54) CROWDSOURCING FOR DOCUMENTS THAT INCLUDE SPECIFIED CRITERIA

(75) Inventors: Bhavnish H. Lathia, Redmond, WA (US); Leon Robert Warman, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 516 days.

(21) Appl. No.: 13/362,215

(22) Filed: Jan. 31, 2012

(51) Int. Cl.
G06F 15/18 (2006.01)
G06N 99/00 (2010.01)
G06K 9/62 (2006.01)

(52) U.S. Cl.
CPC ............ *G06N 99/005* (2013.01); *G06K 9/6256* (2013.01)

(58) Field of Classification Search
None
See application file for complete search history.

(56) References Cited

U.S. PATENT DOCUMENTS 6,618,734 B1 * 9/2003 Williams et al. .................. 1/1
7,251,658 B2 * 7/2007 Dane et al. ........................ 1/1
2007/0136270 A1 * 6/2007 Harney et al. ................... 707/4
2012/0303558 A1 * 11/2012 Jaiswal ........................ 706/12
2013/0018900 A1 * 1/2013 Cheng et al. ................. 707/755

OTHER PUBLICATIONS

"Reliable Normalization in Resume Information Extraction" Jonathan Medema Utrecht University Faculty of Humanities Master Language and Speech Technology Nov. 2008.*

* cited by examiner

*Primary Examiner* — Kakali Chaki
*Assistant Examiner* — Luis Sitiriche
(74) *Attorney, Agent, or Firm* — Lee & Hayes, PLLC

(57) ABSTRACT

Techniques for utilizing a pool of human workers along with an automated classification feedback loop for identifying documents that meet certain criteria. As described herein, a requestor that desires to locate documents that meet certain specified criteria may first program a classifier with the specified criteria. The requestor may also determine the desired classes into which the classifier will categorize documents that are run against the classifier. The requestor may then locate one or more documents that represent each of the determined classes and then train the classifier using the documents. Thereafter, the requestor may publish a request to a pool of human workers soliciting documents meeting the criteria. Each of the documents may be run against the trained classifier and passed onto the requestor for further analysis if the classifier categorizes the respective document as acceptable.

25 Claims, 5 Drawing Sheets

CROWDSOURCING FOR DOCUMENTS THAT INCLUDE SPECIFIED CRITERIA

BACKGROUND

Companies often seek qualified candidates for varying employment positions with these companies. These companies may use many different techniques to locate these candidates, such as employing or contracting with "sourcers" to find competent individuals for consideration by hiring managers. Sourcers spend a majority of their time performing three primary tasks: (1) working with hiring managers to develop job descriptions; (2) finding candidate resumes that meet qualifications of the developed job descriptions, and (3) vetting qualifications, interest, and availability of qualified candidates that the sourcers have located.

To find candidate resumes, sourcers often perform manual tasks, such as searching websites, attending recruiting events, networking with individuals in particular fields, and the like. Unfortunately, sourcers often spend a majority of their time performing these manual tasks of simply locating resumes of qualified candidates, rather than spending this time performing higher-value functions, such as developing accurate job descriptions and vetting qualified candidates.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
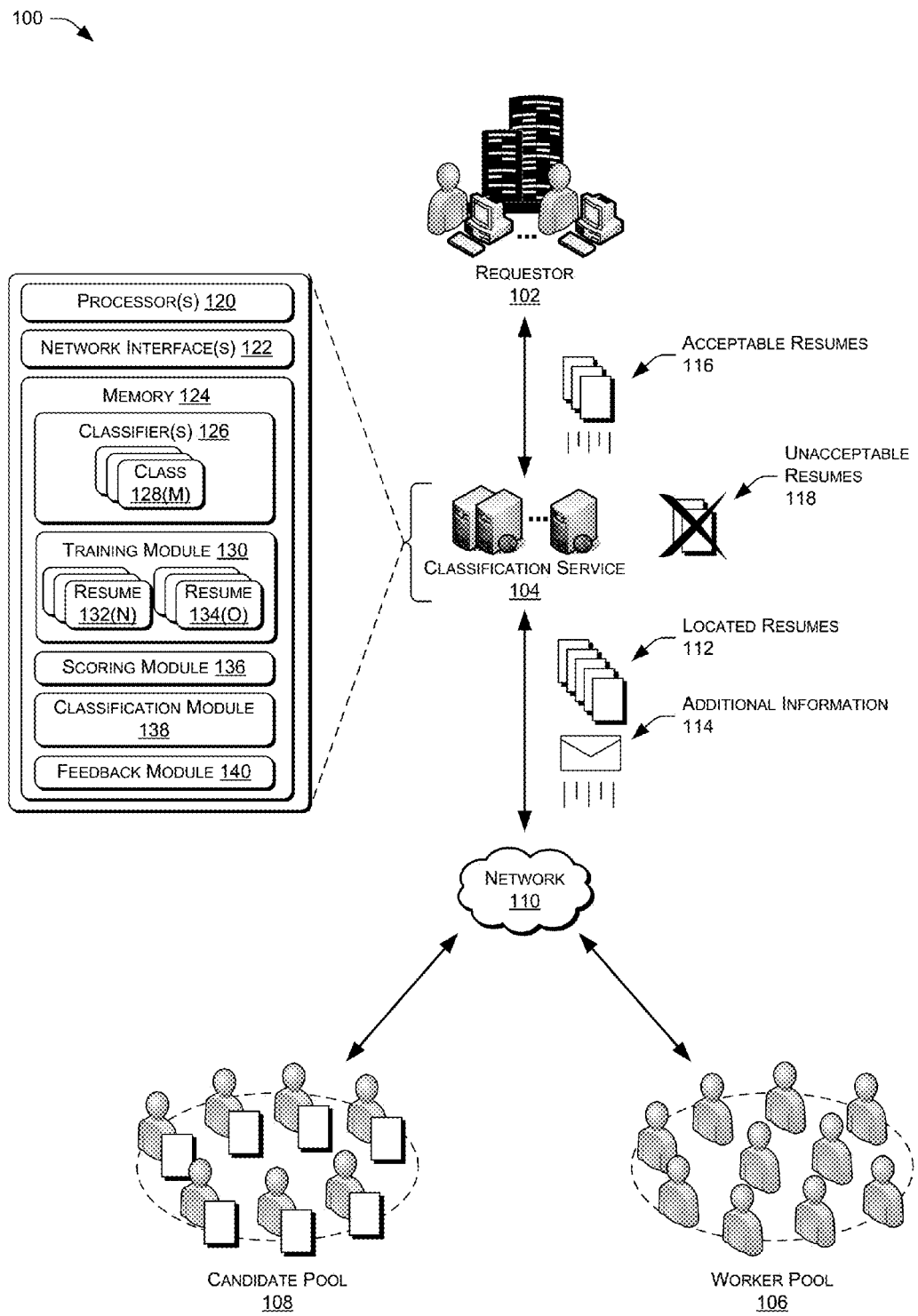
FIG. 1 illustrates an example environment where a company (or other requestor) may utilize a pool of human workers outside of the company to locate resumes or other types of documents meeting specified criteria. The environment may then run a trained classifier against the resumes to categorize each of the resumes as either acceptable or unacceptable. The classifier may reject the unacceptable resumes while providing the acceptable resumes to the company for further analysis, thus allowing sourcers and other individuals of the company to spend time performing functions other than aggregating qualified resumes.

This disclosure describes, in part, techniques for utilizing a pool of human workers along with an automated classification feedback loop for identifying documents that meet certain criteria. For instance, a requestor that desires to locate documents that meet specified criteria may first program a classifier with the specified criteria. The requestor may also determine the desired classes into which the classifier will categorize documents that are run against the classifier. The requestor may then locate one or more documents that represent each of the determined classes. For instance, if the requestor determines that the classifier is to include a class for documents that include the specified criteria and a class of documents that do not, the requestor may identify one or more documents that meet the criteria and one or more documents that do not. The requestor may then train the classifier using both sets of training documents.

After, before, or while training the classifier, the requestor may also issue a request to a pool of human workers to locate documents that include the specified criteria. In some instances, this pool of human workers is outside of an organization that employs or contracts with the requestor and/or is otherwise independent of the requestor. In some instances, the pool of human workers comprises a pool of "unskilled" workers—or human workers that either do not have formal training for identifying the documents or are not required to have formal training for inclusion into the pool. For instance, if the requestor requests that the pool of human workers identify a set of resumes of individuals having certain qualifications, the pool may comprise individuals that do not have formal training in the human-resource or recruiting field. As used herein the term "resume" includes any sort of document that specifies skills, qualifications, experience, demographic information, and/or any other information associated with an individual.

In some instances, the pool of human workers may comprise a crowdsourcing Internet marketplace, such as Mechanical Turk™ by Amazon.com™, Google Answers™ by Google™, or another such service. In each of these instances, human workers of the pool of human workers may receive the request from the requestor over a network and engage in subsequent communications with the requestor over the network. For instance, the requestor may publish the request to a particular website associated with the pool and human workers of the pool may receive the request via the website. After identifying documents that the worker believes to meet the criteria, the worker may then upload the documents to the requestor (and/or the classifier) via the website. Of course, the human workers may additionally or alternatively provide these documents, or information for locating the documents or the criteria associated with the documents, to the requestor and/or the classifier in any other manner.

After receiving the request to locate documents meeting the specified criteria, human workers of the pool may choose to attempt to locate one or more documents meeting this criteria. After identifying these documents, the human workers may provide these documents to the classifier, to the requestor, or to another entity as described immediately above. In either instance, the classifier may run against the criteria associated with the documents for categorization into the determined classes. These documents may then be categorized and provided to different locations based on the categorization.

For instance, if the classifier includes a class of documents that meet the criteria and a class of documents that do not meet the criteria, the classifier may reject the documents that do not meet the criteria. For instance, the classifier may determine which of the criteria the respective document fails to meet and may provide an indication of the rejection and an explanation of what the document is lacking to the human worker that provided the document.

Conversely, if the classifier categorizes a respective document as meeting (or exceeding) the criteria, then the classifier may provide the document to the requestor for further analysis (e.g., by another classifier, by human worker associated with the requestor such as a sourcer or hiring manager, or the like). In addition, the classifier, the requestor, or another entity may provide compensation to the human worker that provided the document. This compensation may comprise monetary compensation, gift card(s), access to digital content, a physical item, reputation points on the website associated with the pool of human workers, or any other type of compensation.

In some instances, the classifier (or another entity) may also route a document to one or more locations based on the class into which the document has been classified or based on a score given to the document by the classifier. For instance, in addition to classifying the documents received from the pool of human workers, the classifier may also score the documents. Therefore, a document that receives a relatively higher score may be passed to more and/or higher-ranking people within an organization as compared to a document that receives a relatively lower score yet still falls into the acceptable class.

In addition or in the alternative, the classifier may selectively route a document based on other characteristics. For instance, if the document comprises a resume associated with an individual in a particular geographic location, then the classifier may route the resume to a hiring manager in a nearby geographic location. Furthermore, if the document comprises a resume indicating that a corresponding individual has extensive qualifications in a certain area, then the classifier may route the resume to one or more locations based on these qualifications. For instance, if a resume indicates that a user associated with the resume has extensive experience in computer security, then the classifier may route the resume to a manager responsible for hiring security analysts within an organization. Additionally or alternatively, if a resume indicates that a user associated with the resume has extensive experience in human resources, then the classifier may route the resume to a manager responsible for hiring human resource employees within the organization.

The techniques described herein may apply to categorizing an array of different documents based on an array of different criteria. For instance, the techniques may apply to identifying resumes of qualified candidates for a company, for identifying literary works of fiction or non-fiction that meet certain criteria (e.g., a certain page length, genre, etc.), for identifying advertisements for certain products, or for categorizing any sort of document based on any sort of qualifications or criteria. By crowdsourcing these documents prior to passing suitable documents on for further inspection, the techniques may allow a requestor to focus more on analyzing the suitable documents rather than simply locating and sifting through an initial set of documents.

FIG. 1 provides an example environment that may implement these techniques in the context of using a pool of human workers to identify resumes for qualified candidates. Of course, this environment and usage scenario represents one of many.

Example Environment

FIG. 1 illustrates an example environment 100 in which a requestor 102 may utilize a classification service 104 and a pool of human workers 106 for identifying resumes of qualified candidates from a candidate pool 108. As described above, the requestor 102 may initially identify one or more job descriptions and corresponding qualifications associated with the job descriptions. The requestor 102 may then train a classifier of the classification service 104 for categorizing received resumes into one of multiple different classes, such as "meets qualifications", "does not meet qualifications", "exceeds qualifications", and the like.

Thereafter, the requestor 102 may publish a request to the pool 106 soliciting resumes that include the desired qualifications. For instance, the requestor 102 may publish the request to a crowdsourcing Internet marketplace that is hosted on one or more servers and that is accessible via a particular website. The pool of workers 106 may each receive or otherwise access the request by navigating to the website hosting the marketplace using a respective client computing device. In this regard, the workers may utilize a desktop computer, a laptop computer, a mobile phone, a tablet computing device, or any other type of suitable computing device for accessing the marketplace. Furthermore, after receiving the request, a human worker from the pool 106 may attempt to locate resumes meeting the qualifications. For instance, a human worker of the pool 106 may search for resumes meeting the qualifications in any online or offline location, such as on social networking websites, school websites, networking events, or the like.

After identifying one or resumes, the human worker may then provide the resumes for categorization by the classifier. For instance, the human worker may upload the resume(s) over a network 110 via the marketplace described above. The network 110 may represent any sort of wired and/or wireless network(s). Furthermore, any of the entities described herein may communicate with one another over the illustrated network 110 and/or any other suitable network. In addition or in the alternative to providing the actual resumes, the human workers may provide information for identifying criteria within the resumes, as described in further detail below.

FIG. 1 further illustrates that the pool of human workers 106 may provide multiple resumes 112 that the human workers have located along with corresponding additional information 114 requested by the requestor 102. For instance, as part of the initial request, the requestor 102 may ask the human workers to provide contact information of an individual associated with a respective resume (e.g., a name, phone number, etc.), as well as a publicly-accessible uniform resource locator (URL) at which the resume may be found. By requesting that the human workers provide a public URL where the resume is located, the requestor 102 may ensure that any received resumes are in fact publicly available for inspection. In some instances described below, the human workers may provide these URLs in lieu of providing the actual resumes themselves, or may provide any other sort of information for identifying criteria associated with the resumes in addition to or in lieu of providing the actual resumes. Of course, in other implementations the information 114 may comprise more, fewer, and/or different pieces of information requested by the requestor 102.

After receiving the located resumes 112 and the additional information 114, the classifier may then categorize the resumes 112 into classes, such as a class of acceptable resumes 116 and a class of unacceptable resumes 118. The acceptable resumes 116 may comprise those resumes that included the additional information requested by the requestor 102 (e.g., public URL, contact info, etc.) and that the classifier categorized as acceptable, while the unacceptable resumes 118 may include those resumes that did not include the additional information requested and/or that the classifier categorized as unacceptable. While FIG. 1 illustrates two classes, it is to be appreciated that the classifier may categorize the resumes into any number of classes. For instance, the acceptable resumes 116 may be categorized into multiple different classes (or sub-classes).

By utilizing the human worker pool 106 to locate the resumes 112, and by categorizing the resumes into acceptable and unacceptable classes, the requestor 102 is able to spend more time performing higher-value functions than simply locating resumes from the candidate pool 108.

As illustrated, the classification service 104 may include one or more computing devices (e.g., one or more servers) that include one or more processors 120, one or more network interfaces 122, and memory 124. The memory 124 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

As illustrated, the memory 124 stores or otherwise has access to one or more classifiers 126 that may be used to categorize received resumes into one of multiple different classes 128(1), ..., 128(M). For instance, the classification service 104 may include a different classifier for each of multiple different job positions, with each of these classifiers being programmed to screen for resumes that include the respective set of qualifications and/or other criteria associated with the job. The classes 128(1)-(M) associated with each classifier, meanwhile, may comprise any type of two or more classes as described above.

In addition, the memory 124 stores or otherwise has access to a training module 130 that functions to train a respective classifier 126 using a set of resumes associated with each respective class of the classifier 126. For instance, if a classifier includes a class of "acceptable" and a class of "unacceptable" resumes, then the training module 130 may train the classifier using a set of resumes 132(1), ..., 132(N) that the requestor 102 has labeled as acceptable (e.g., meeting each qualification of the job description) and a set of resumes 134(1), ..., 134(0) that the requestor 102 has labeled as unacceptable (e.g., not meeting at least one qualification of the job description).

The memory 124 also includes or has access to a scoring module 136, a classification module 138, and a feedback module 140. The scoring module 136 may function to score a received resume by running the resume against the trained classifier. In some instances, the scoring module 136 may score the resume utilizing one or more other factors, such as a reputation of the human worker that provided the resume on the marketplace, a previous success rate of the human worker on this or other projects, or the like. Thereafter, the classification module 138 may categorize the resume into one of the defined classes 128(1)-(M) of the classifier 126. Finally, the feedback module 140 may continue to train the classifier 126 based on the categorized resumes. For instance, the feedback module 140 may continue to train the classes of the classifier based on the resumes categorized as unacceptable, acceptable, and/or the like.

After categorizing the resumes, the classification service 104 may provide results of the categorization to the requestor 102. For instance, the service 104 may provide the acceptable resumes 116 to the requestor 102 while refraining from providing the unacceptable resumes 118. The requestor may then further analyze the acceptable resumes 112 by, for example, determining the respective candidate's interest, availability, and the like. In addition, the requestor 102 (or another entity) may provide compensation to a human worker of the pool of human workers 106 for successfully providing an acceptable resume, as described above. Meanwhile, the classification service 104 (or another entity) may provide an indication of the rejection to the human workers that provided unacceptable resumes, along with an indication of why the respective resumes were rejected.

While FIG. 1 illustrates one example architecture, it is to be appreciated that multiple other architectures may implement the described techniques. For instance, the modules of the classification service 104 may reside at premises of the requestor 102, spread out amongst multiple different locations, or may reside in any other location or combination of locations.

Example Processes

Figure 2A:
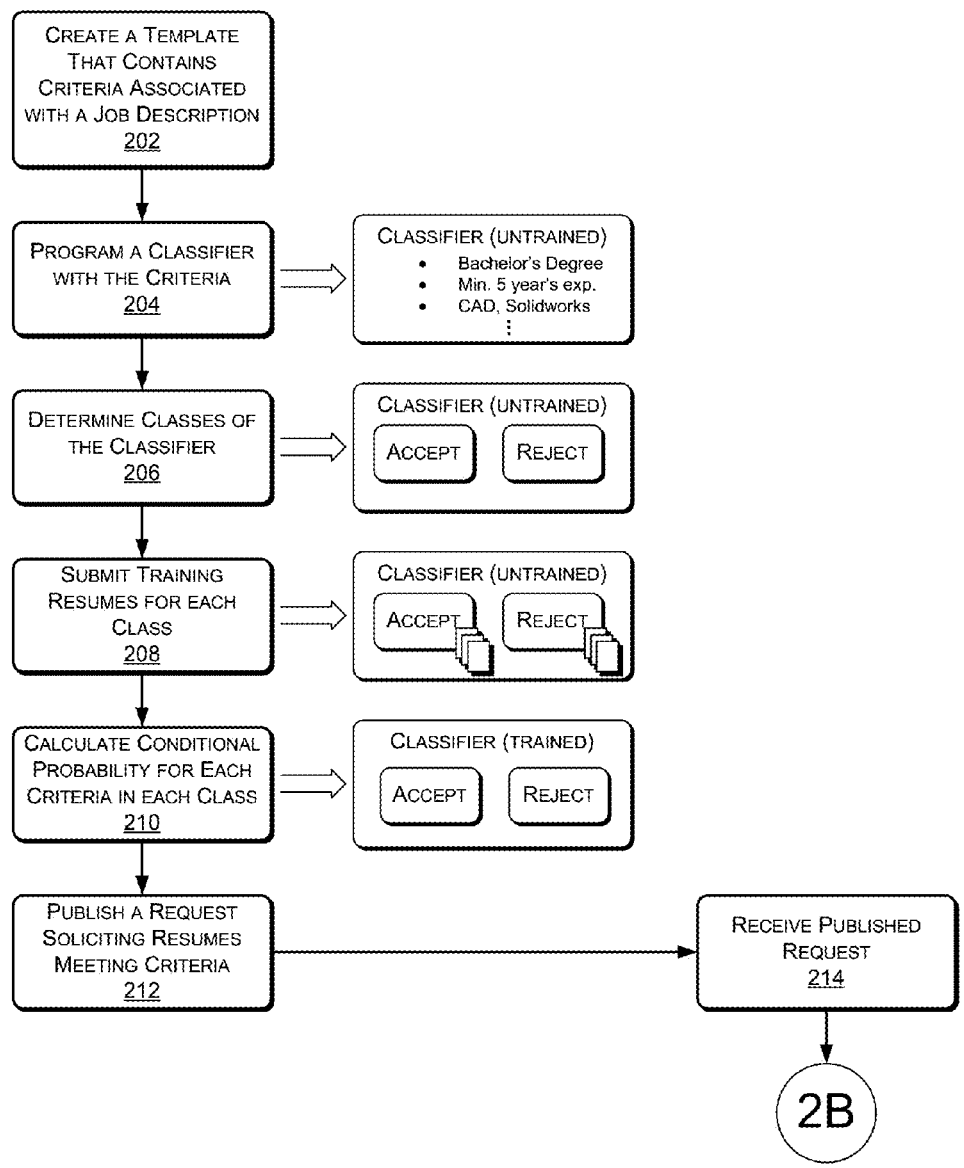
FIGS. 2A-C collectively illustrate an example process for training a classifier to categorize resumes, publishing a request to a pool of human workers for locating resumes that meet specified criteria, running the classifier against resumes received from human workers of the pool, and providing an acceptable class of resumes for further analysis to the requestor of FIG. 1.
Figure 2B:
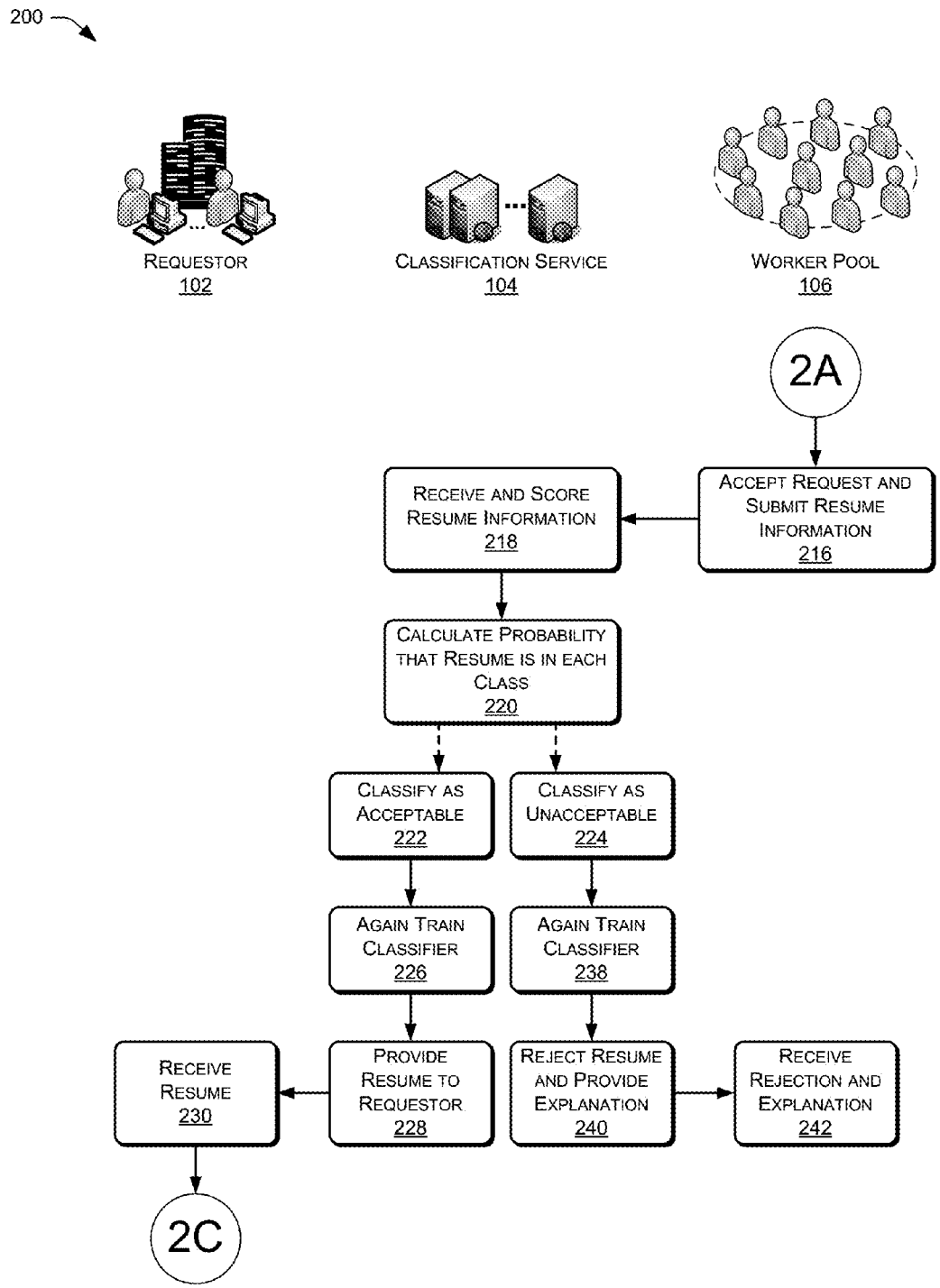
Figure 2C:
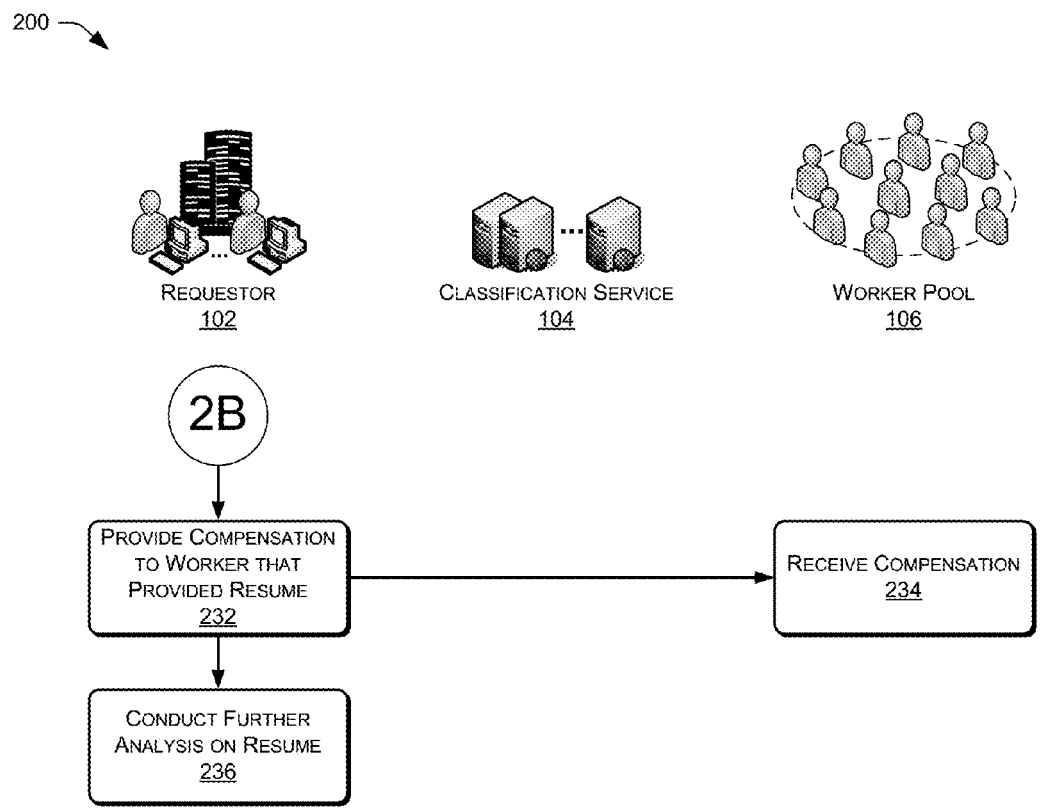

FIGS. 2A-C collectively illustrate an example process 200 for performing the techniques described herein. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

In this example, operations illustrated beneath the requestor 102 may be performed by the requestor 102, operations illustrated beneath the classification service 104 may be performed by the classification service 104, and operations performed by the worker pool 106 may be performed by the worker pool 106. However, it is to be appreciated that in other implementations the operations may be performed at any other location(s).

The process 200 includes, at 202, the requestor 102 creating a template that contains criteria associated with a particular job description. This may include requisite skills, degrees, years of experience, requisite geographical location, or the like. In some instances, the created template comprises a template for uploading to a crowdsourcing Internet marketplace that is accessible by the worker pool 106.

At 204, the requestor 102 then programs a classifier with the criteria, as illustrated. This classifier may comprise a naïve Bayes classifier or any other binary or multiclass probabilistic classifier. At 206, the requestor 102 then determines two or more classes of the classifier, such as acceptable ("Accept"), unacceptable ("Reject"), or the like. As described above, the classifier may be programmed to implement any number of multiple classes.

At 208, the requestor 102 then submits training resumes for each class and, at 210, calculates the conditional probability for each piece of criteria given the class that the resume is in. The process 200 then collects the tokens (e.g., words, phrases, etc.) that quantity the criteria.

At 212, the requestor 102 then publishes a request to the worker pool 106 soliciting resumes meeting the specified criteria. In some instances, the requestor 102 utilizes the template created at 202. Furthermore, in some instances the requestor 102 publishes the request to the worker pool 106 generally, while in other instances the requestor 102 publishes the request to a portion of the pool (e.g., human workers working in a certain field, having a threshold success rate for prior projects, or the like). At 214, the worker pool 106 receives the request (e.g., at the marketplace).

FIG. 2B continues the illustration of the process 200 and includes, at 216, one or more human workers of the pool 106 accepting the request and submitting information for identifying criteria associated with one or more resumes for categorization by the classification service 104. Submitting this information may comprise submitting the resumes themselves, submitting the criteria mined from the resumes (e.g., education, experience, etc.), submitting information for locating the resumes (e.g., a URL that links to the resumes), submitting information for locating criteria associated with the resumes (e.g., a URL that links to the criteria within the resumes), or any other type of information that is effective to identify criteria specified within a resume.

The classification service 104 receives the information and scores the resumes at 218 using the trained classifier. At 220, the classification service 104 calculates the probability that a respective resume is in each class associated with the classifier.

In one example, and as shown at 222, the classification service 104 categorizes the resume into the acceptable class. In another example, and as shown at 224, the classification service 104 categorizes the resume into the unacceptable class. In the instance of categorizing the resume as acceptable, the classification service 104 may again train the classifier at 226 using the acceptable resume and, at 228, may provide this resume to the requestor 102. The requestor 102 (e.g., a sourcer, a hiring manager, etc.) may receive this resume at 230.

In some instances, the classifier is configured to operate in an operational mode, in which the classifier categorizes resumes (or other documents) into classes, or in a training mode, in which the classifier is being trained or re-trained. In these instances, the process 200 may pool the resumes or other documents categorized into the respective classes and may wait to re-train the classifier until after the classifier transitions from the operational mode to the training mode. This transition may occur after a predetermined amount of time, after pooling a predetermined amount of resumes (collectively or in a particular class), or in response to any other trigger. For instance, the classifier may transition to the training mode when the amount of unacceptable resumes exceeds a threshold amount, either in terms of raw numbers or in terms of a ratio of unacceptable resumes to acceptable resumes.

FIG. 2C continues the illustration of the process 200 and, at 232, represents the requestor 102 providing compensation to the human worker that provided the resume. In some instances, the amount of compensation may vary based on the categorization and/or score of the resume. For instance, the requestor 102 may provide a certain level of compensation for a resume categorized as meeting certain criteria, while providing a greater level of compensation for a resume categorized as exceeding the criteria. In either instance, the human worker receives the compensation at 234. Finally, at 236, the requestor 102 may conduct further analysis on the resume by, for example, vetting the resume further (e.g., calling references, etc.), determining interest and availability of the candidate, forwarding the resume to an appropriate location within an organization, or the like.

Returning to FIG. 2B, if the classification service 104 categorizes the resume as unacceptable, then at 238 the classification service 104 may again train the classifier using this rejected resume. At 240, the classification service 104 may reject the resume and provide an explanation to the human worker that provided the resume as to why the service 104 is rejecting the resume (e.g., because the resume does not specify a certain qualification, because the human worker did not provide a public URL where the resume is available, etc.). The human worker thereafter receives the rejection and explanation at 242.

Figure 3:
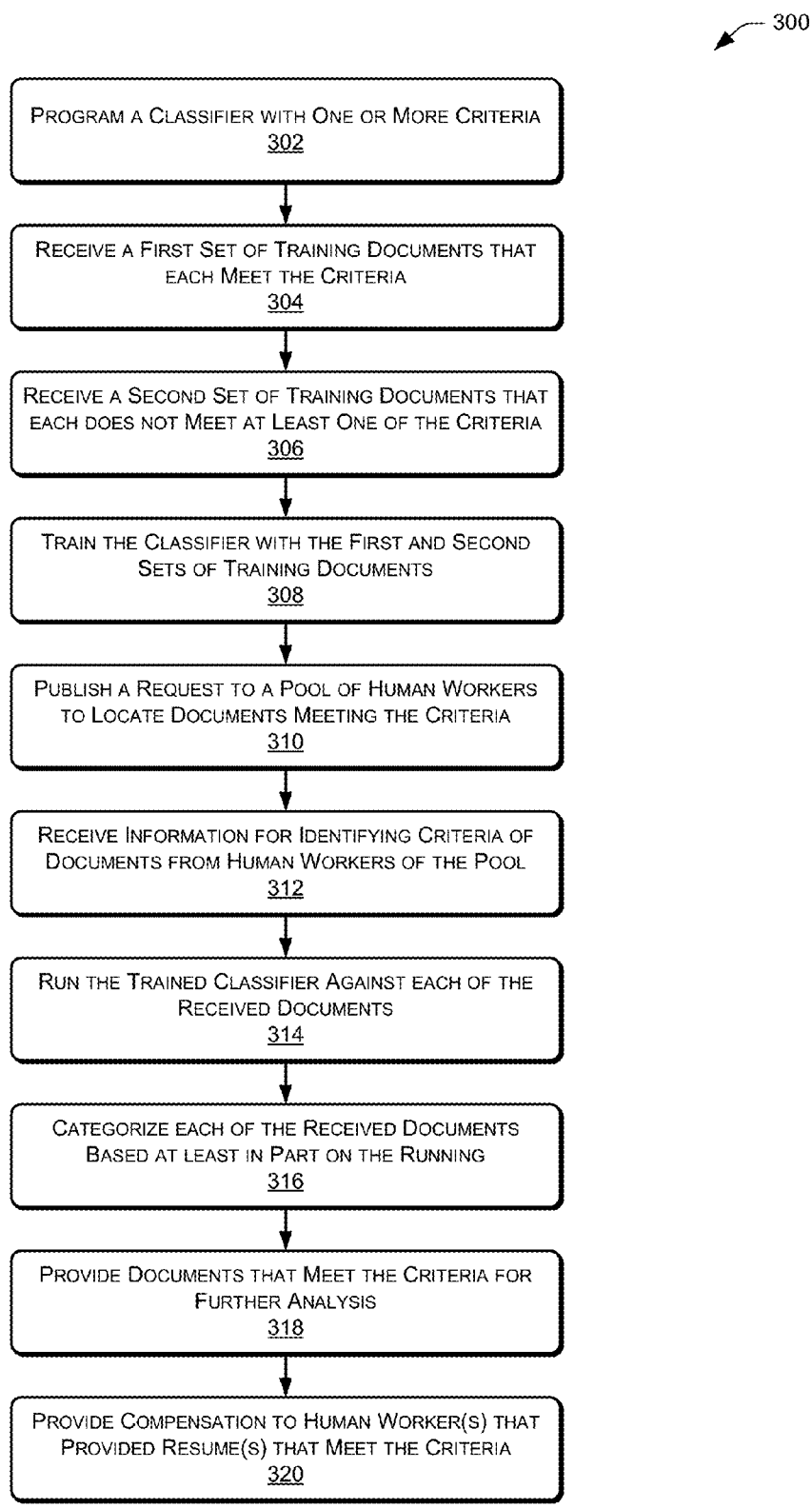
FIG. 3 illustrates an example process for training a classifier for categorizing documents, receiving documents from a pool of human workers, and categorizing the received documents with use of the trained classifier.

FIG. 3 illustrates another example process 300 for categorizing documents using a trained classifier. This process 300 includes, at 302, programming a classifier with one or more criteria, such as multiple qualifications associated with a job description. At 304, the process 300 receives a first set of training documents that each meet the criteria and, at 306, receives a second set of training documents that each does not meet at least one of the criteria. At 308, the process 300 then trains the classifier using the first and second sets of training documents.

At 310, the process 300 publishes a request to a pool of human workers to locate documents meeting the one or more criteria. At 312, and at least partly in response to the publishing, the process 300 receives information for identifying criteria associated with one or more documents from the pool of human workers. This may include receiving the actual documents, receiving an indication of the criteria associated with the documents, receiving a URL for locating the documents or the criteria, or a combination thereof. At 314, the process 300 runs the trained classifier against each of the documents and, at 316, categorizes each of the documents based at least in part on the running.

At 318, the process 300 then provides documents that meet the specified criteria for further analysis (e.g., to a requestor that initially published the request). Finally, at 320, the process 300 may provide compensation to human workers that provided resumes that meet the specified criteria. In some instances, the process 300 may refrain from providing compensation to human workers that provided resumes that did not meet the criteria or may provide a lesser compensation.

Example Implementation

In one particular example described below, the described techniques may utilize a naïve Bayes classifier for categorizing resumes as either acceptable or unacceptable based on whether or not the resumes satisfy the defined acceptance criteria. In this example, envision that the resumes are drawn from a number of classes of resumes which can be modeled as sets of words where the (independent) probability that the i-th term of a given resume occurs in a resume from class C can be written as the following:

$$P(t_i|C) \tag{1}$$

In this example, the process looks for a resume that contains a particular word or phrase that matches one of the predefined criteria. In addition, the process may assume that words are randomly distributed in the resume (i.e., that words are not dependent on the length of the resume, position within the resume with relation to other words, or other resume-context). As such, the probability that a given resume R contains all of the words/phrases $w_i$, given a class C is represented as the following:

$$P(R|C) = \Pi_i P(t_i|C) \quad (2)$$

Now, the probability that a given resume R belongs to a given class C becomes the following:

$$P(R|C) = P(R \cap C)/P(C) \text{ and } P(C|R) = P(C|R) = P(C \cap R)/P(R) \quad (3)$$

Bayes' theorem manipulates these into a statement of probability in terms of likelihood, as follows:

$$P(C \mid R) = \frac{P(C)}{P(R)} P(R \mid C) \quad (4)$$

Assuming, in this example, that the classifier includes two mutually exclusive classes, A (resume is acceptable) and ¬A (resume is not acceptable), the equation becomes:

$$P(R|A) = \Pi_i p(t_i|A) \text{ and } (R|\neg A) = \Pi_i P(t|\neg A) \quad (5)$$

Now, using the Bayesian result above:

$$P(A \mid R) = \frac{P(A)}{P(R)} \Pi_i P(t_i \mid A) \text{ and } P(R \mid \neg A) = \frac{P(\neg A)}{P(R)} \Pi_i P(t_i \mid \neg A) \quad (6)$$

Dividing one by the other gives:

$$\frac{P(A \mid R)}{P(\neg A \mid R)} = \frac{P(A) \Pi_i P(t_i \mid A)}{P(\neg A) \Pi_i P(t_i \mid \neg A)} \quad (7)$$

Which can be re-factored as:

$$\frac{P(A \mid R)}{P(\neg A \mid R)} = \frac{P(A)}{P(\neg A)} \prod_i \frac{P(t_i \mid A)}{P(t_i \mid \neg A)} \quad (8)$$

Thus, the probability ratio $P(A|R)/P(\neg A|R)$ can be expressed in terms of a series of ratios. The actual probability $P(A|R)$ can be computed from $\log(P(A|R)/P(\neg A|R))$ based on the observation that $P(A|R)/P(\neg A|R) = 1$. Taking the logarithm of all these ratios gives the following:

$$\log \frac{P(A \mid R)}{P(\neg A \mid R)} = \log \frac{P(A)}{P(\neg A)} + \sum_i \log \frac{P(t_i \mid A)}{P(t_i \mid \neg A)} \quad (9)$$

In the case of two mutually exclusive alternatives (e.g., categorizing a resume as acceptable or not acceptable), the conversion of a log-likelihood ratio to a probability means the resume is deemed acceptable if:

$$P(A|R) > P(R|\neg A) \text{ or } \log \frac{P(A \mid R)}{P(\neg A \mid R)} > 0 \quad (10)$$

Otherwise, the techniques may categorize the resume as not acceptable.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. One or more non-transitory computer-readable media storing computer-executable instructions that, when executed on one or more processors, cause the one or more processors to perform acts comprising:
    programming a computer-implemented classifier with multiple qualifications associated with a job description;
    receiving a first set of training resumes that specify the multiple qualifications;
    receiving a second set of training resumes that do not specify at least one of the multiple qualifications;
    training the computer-implemented classifier to categorize resumes as meeting the multiple qualifications or not meeting the multiple qualifications based at least in part on the first set of training resumes and the second set of training resumes, wherein the training the computer-implemented classifier produces a trained computer-implemented classifier;
    publishing a request to a pool of human workers via a crowdsourcing electronic marketplace to request the human workers to locate resumes that meet the multiple qualifications and to request contact information of candidates associated with the resumes, wherein the candidates are not included in the pool of human workers;
    receiving, based at least in part on the request, a resume of a candidate from a human worker included in the pool of human workers; and
    categorizing, using the trained computer-implemented classifier, the resume as either meeting the multiple qualifications or not meeting the multiple qualifications based at least in part on the contact information of the candidate being received from the human worker, and wherein the trained computer-implemented classifier applies predetermined criteria to classify the resume.

2. One or more non-transitory computer-readable media as recited in claim 1, the acts further comprising providing resumes categorized as meeting the multiple qualifications for further analysis, while refraining from providing resumes categorized as not meeting the multiple qualifications for further analysis.

3. One or more non-transitory computer-readable media as recited in claim 1, the acts further comprising causing compensation to be provided to the human worker at least partly in response to categorizing the resume as meeting the multiple qualifications.

4. A method comprising:
    under control of one or more computing systems configured with executable instructions,
    training a classifier to categorize individual ones of multiple resumes into one of multiple classes, the training of the classifier producing a trained classifier;
    publishing a request to a pool of human workers via a crowdsourcing electronic marketplace to request the pool of human workers to locate resumes for categorization using the trained classifier and to provide contact information of candidates associated with the resumes, wherein the candidates are not included in the pool of human workers;

receiving, based at least in part on the request, a resume of a candidate from a human worker of the pool of human workers; and categorizing, using the trained classier, the resume into one of the multiple classes based at least in part on the contact information of the candidate being received from the human worker, and wherein the trained classifier applies predetermined criteria to classify the resume.

5. A method as recited in claim 4, further comprising selecting individual ones of the pool of human workers based at least in part on information from prior projects associated with the individual ones of the pool of human workers.

6. A method as recited in claim 4, wherein:
the multiple classes include at least a first class of resumes that include a specified set of one or more criteria and a second class of resumes that do not include the specified set of one or more criteria; and
the training of the classifier comprises:
locating at least one resume that includes the specified set of one or more criteria and at least one resume that does not include the specified set of one or more criteria; and
training the classifier using the at least one resume that includes the specified set of one or more criteria and the at least one resume that does not include the specified set of one or more criteria.

7. A method as recited in claim 6, wherein the request published to the pool of human workers specifies the set of one or more criteria.

8. A method as recited in claim 4, wherein the training of the classifier comprises training the classifier for a particular job description based at least in part on one or more qualifications associated with the job description.

9. A method as recited in claim 4, wherein:
the multiple classes include a class of acceptable resumes and a class of unacceptable resumes; and
the categorizing comprises categorizing the resume into the class of acceptable resumes or into the class of unacceptable resumes.

10. A method as recited in claim 9, further comprising:
again training the trained classifier using at least one resume that has been categorized into the class of unacceptable resumes.

11. A method as recited in claim 9, further comprising:
again training the trained classifier using at least one resume that has been categorized into the class of acceptable resumes.

12. A method as recited in claim 9, further comprising:
providing resumes categorized into the class of acceptable resumes for further analysis by one or more of the pool of human workers, while refraining from providing resumes categorized into the class of unacceptable resumes for further analysis by the pool of human workers.

13. A method as recited in claim 9, further comprising:
compensating the human worker at least partly in response to categorizing the resume into the class of acceptable resumes.

14. A method as recited in claim 9, further comprising:
at least partly in response to categorizing the resume received from the human worker into the class of unacceptable resumes, providing an explanation to the human worker regarding why the resume has been categorized as unacceptable.

15. A method as recited in claim 4, wherein:
the multiple classes include a class of resumes that meets specified criteria, a class of resumes that exceeds the specified criteria, and a class of resumes that does not meet the specified criteria; and
categorizing additional resumes comprises categorizing the additional resumes into at least one of the class of resumes that meets specified criteria, the class of resumes that exceeds the specified criteria, or the class of resumes that does not meet the specified criteria.

16. A method as recited in claim 4, wherein the classifier comprises a naïve Bayes classifier.

17. A method as recited in claim 4, wherein categorizing, using the trained classier, the resume into one of the multiple classes includes determining that the human worker has provided a publicly-accessible uniform resource locator (URL) that links to the resume provided by the human workers.

18. A system comprising:
one or more processors; and
one or more computer-readable media storing computer-executable instructions that, when executed on the one or more processors, cause the one or more processors to perform acts comprising:
publishing a request to a pool of human workers via a crowdsourcing electronic marketplace to request the pool of human workers to locate documents for categorization using a classifier and to request contact information of candidates associated with the documents, wherein the candidates are not included in the pool of human workers;
receiving a document from a human worker included in the pool of human workers, wherein the document is associated with a candidate that is not included in the pool of human workers;
determining that the document is publicly available based at least in part on receiving at least one of a publicly-accessible uniform resource locator (URL) associated with the document or the contact information of the candidate; and
categorizing, using the classifier, the document into one of multiple classes based, at least in part, on determining that the document is publicly available and on the contact information of the candidate being received from the human worker; and wherein the trained classifier applies predetermined criteria to classify the document.

19. A system as recited in claim 18, the acts further comprising selecting individual ones of the pool of human workers based at least in part on a predetermined field of work.

20. A system as recited in claim 18, the acts further comprising:
training the classifier to categorize the documents into the multiple classes prior to the categorizing.

21. A system as recited in claim 20, wherein the training the classifier comprises training the classifier using a first set of training documents that include one or more specified criteria and a second set of training documents that do not include at least a portion of the one or more specified criteria.

22. A system as recited in claim 18, the acts further comprising:
providing documents categorized into a first of the multiple classes for further analysis; and
refraining from providing documents categorized into a second of the multiple classes for further analysis.

23. A system as recited in claim 18, the acts further comprising:
providing documents categorized into a first of the multiple classes to a first location for further analysis; and providing documents categorized into a second of the multiple classes to a second, different location for further analysis.

24. A system as recited in claim 18, wherein the request published to the pool of human workers specifies one or more desired criteria, and the classifier is trained to categorize documents as meeting the one or more desired criteria or not meeting the one or more desired criteria.

25. A system as recited in claim 18, the acts further comprising providing an explanation to an additional worker of the pool of human workers that an additional resume was rejected by the classifier because the additional resume was not associated with a corresponding publicly-accessible URL.

* * * * *